Figure 3:
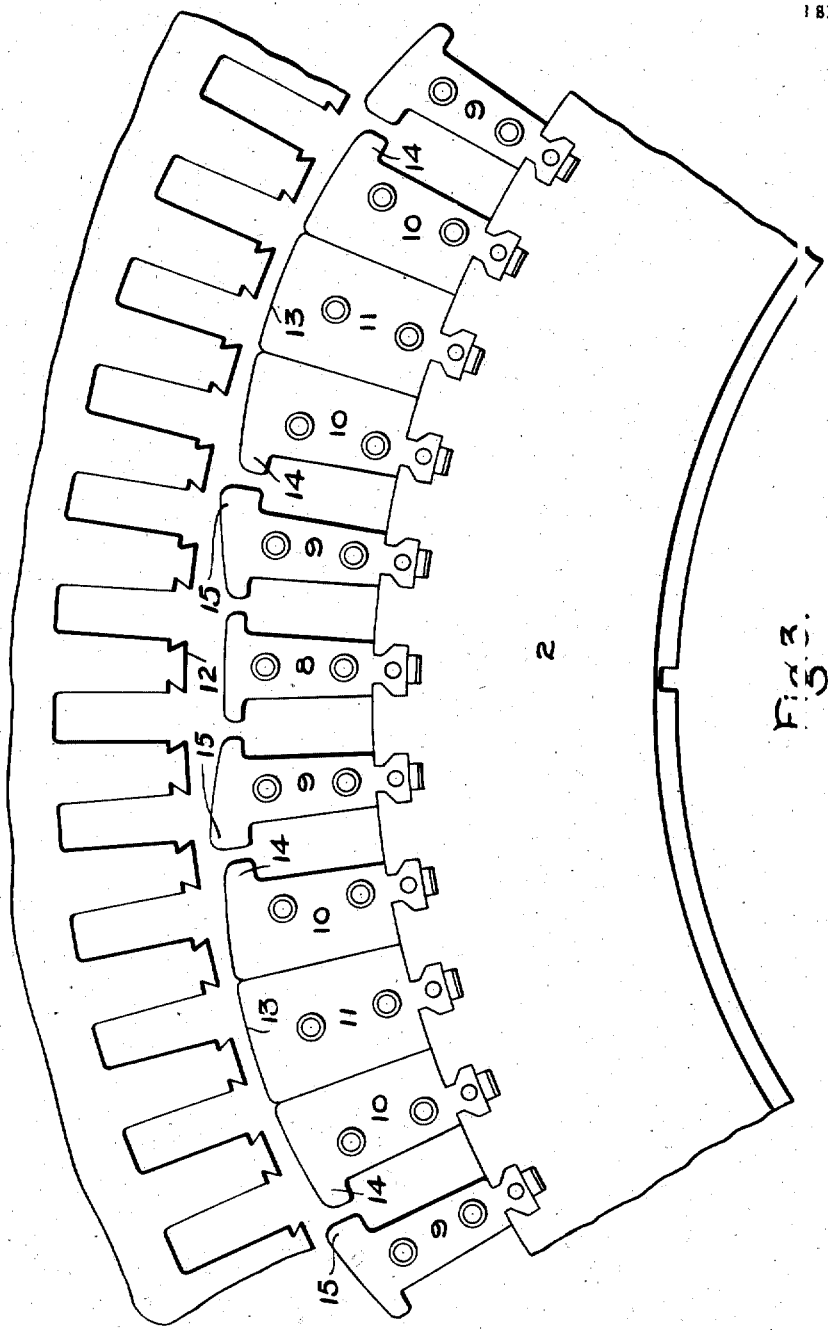

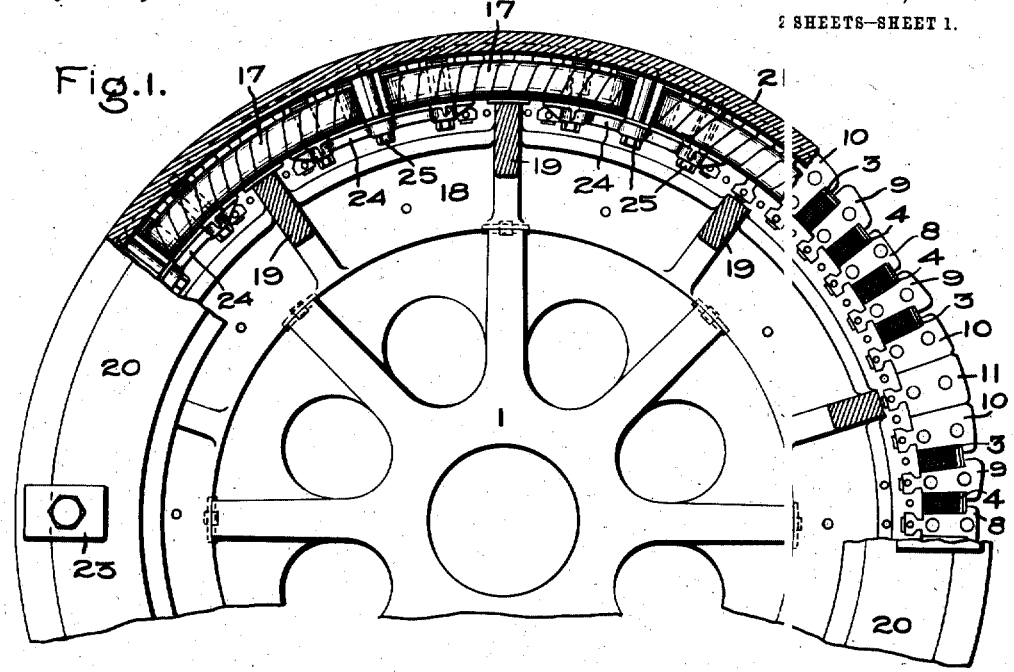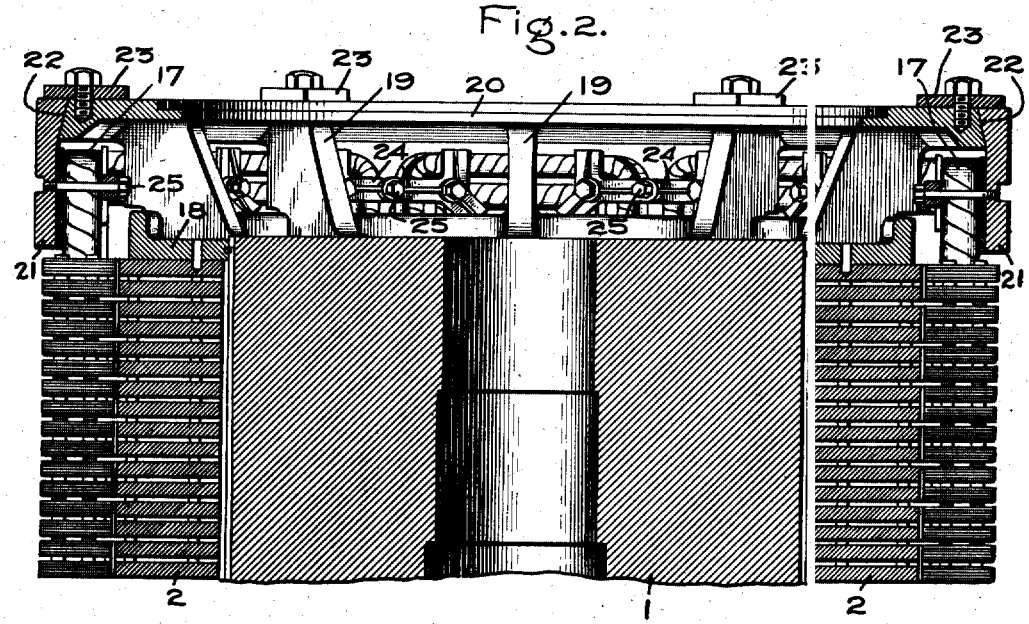

H. G. REIST.
DYNAMO ELECTRIC MACHINE.
APPLICATION FILED MAY 19, 1909.

1,008,561.

Patented Nov. 14, 1911.
2 SHEETS—SHEET 2.

Witnesses:
Marcus L. Byng.
J. Ellis Glenn.

Inventor:
Henry G. Reist,
by Allen H. Davis
Atty.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

1,008,561.  Specification of Letters Patent.  Patented Nov. 14, 1911.

Application filed May 19, 1909. Serial No. 496,978.

*To all whom it may concern:*

Be it known that I, HENRY G. REIST, a citizen of the United States, residing at Schenectady, county of Schenectady, State of New York, have invented certain new and useful Improvements in Dynamo-Electric Machines, of which the following is a specification.

My invention relates to dynamo electric machines, and more particularly to field magnet structures in which the winding is distributed, as distinguished from those structures which have definite or salient poles. Such field magnet structures are known in the art as the smooth core type. In such structures the central portion of the pole is magnetized by all the turns on the pole, while outside of the center portion it is magnetized only by the turns surrounding the outside portion. In building these field magnets it is usual to distribute the winding only in a small number of coils. They have been built heretofore with a uniform air-gap, and when the winding is distributed in a small number of coils, the magnetic density on one side of a coil will be considerably less than on the other side of the same coil. In order to improve the flux distribution, I shape the faces of the portions of the core between the coils which make up the pole, so that they diverge from the periphery of the armature of the dynamo electric machine in a direction away from the center of the pole, the divergence of the several faces being such as to produce a substantially sinusoidal distribution of flux. The core between the coils of the winding is preferably made up of members or coil holders placed in position as shown and described in the patent to Sulzberger, No. 902,020, patented October 27, 1908.

Other features of novelty which characterize my invention are pointed out in the claims annexed to and forming a part of this specification. For a better understanding of my invention, however, reference may be had to the following description taken in connection with the accompanying drawing, in which—

Figure 1 is an end elevation of a revolving field magnet structure of a dynamo electric machine embodying my invention, with parts broken away and in section; Fig. 2 is a sectional view of the construction shown in Fig. 1; and Fig. 3 is an enlarged view of a portion of the same field magnet structure with the coils removed for the sake of clearness.

Referring to the drawings, 1 represents the spider carrying the revolving field magnet of a dynamo electric machine. The core 2 of the field magnet is mounted on the spider 1 and in the particular machine illustrated is provided with ten polar portions. The windings of the field magnet comprise similar sets of conductors, each in the form of two loops or coils 3 and 4, one set surrounding each polar portion. The coils 3 and 4 are held in place by sets of coil holders or members 8, 9 and 10, made of magnetic material and preferably laminated. Each polar portion of the field magnet structure is made up of two members 9, two members 10, and a central member 11. Both of the coils 3 and 4 surround the members 10 and 11, which together form the central part of the pole. The members 9 are surrounded only by the outside coil 4, and the members 8 are not surrounded by any of the coils. Therefore, the central part of the pole is magnetized by twice the number of ampere turns that the members 9 are magnetized by, that is, of course, with the ampere-turns of the coils 3 and 4 the same. The reluctance of the path of the flux depends mainly upon the air-gap, and is practically proportional to it, and in order to get a sinusoidal distribution of flux, I have provided a variable air-gap between the armature and the field magnet, as is clearly seen in Fig. 3, in which 12 represents a lamination of the armature. This variable air-gap is produced by constructing the coil holders constituting the pole portions so that they diverge from the periphery of the armature in a direction away from the center of the pole in the manner hereinafter described. The members 10 and 11, forming the center part of the pole, diverge from the periphery of the armature from the center 13 of the poles toward each side 14, so that the air-gap at each side is substantially double that at the center of the pole. The members 9 diverge from the periphery of the armature toward the sides of the pole at a greater angle than that of the holders or members forming the center part of the pole. The portions of the members 9 which are toward the center of the pole are longer than the adjacent portions of the members 10. The air-gap at the end 15 of the member 9 is the same as that at the center 13 of the pole. The construction of the members, as described above, gives a smooth curve of flux distribution, which is substantially sinusoidal.

The coils 3 and 4 have end turns or connections 17. These end turns must be supported so that they will be held rigidly and firmly in place against the enormous centrifugal forces exerted thereon when the revolving field magnet is rotating at high speed. The end flange 18, which is keyed on the spider 1 and holds the laminations in place, has arms 19 extending therefrom. The annular end cover 20 is fastened to the arms 19 in usual manner, and in accordance with my invention has its outside periphery tapered. The cylindrical cover 21 has a portion 22 of its inside periphery tapered in the same direction as the end cover, the tapered portion of the end cover and cylindrical cover coöperating, as shown in Fig. 2. Flat pieces of metal 23 are bolted to the end cover and abut against and exert a lateral pressure upon the end of the cylindrical cover in order to stretch the cylindrical cover, and to compress the end cover, so that the surfaces of the cylindrical cover and the end cover will remain in contact and the cylindrical cover will remain centered when the field magnet is revolving at high speed. The end turns 17 are clamped in place against radial displacement by means of the members 24 which are bolted to the cylindrical cover by means of bolts 25, and thus the end turns are clamped between the members 24 and the cylindrical cover 21.

I have illustrated my invention in connection with a ten-pole field magnet having two coils per pole, but it is evident that it is not limited to any number of poles or any number of coils per pole. With a greater number of coils per pole the amount that each coil holder diverges from the periphery of the armature must be modified accordingly.

I aim in the appended claims to cover all modifications which do not depart from the spirit and scope of my invention.

What I claim as new and desire to secure by Letters Patent of the United States is,

1. In combination with the armature of a dynamo electric machine, a field magnet structure having a core, a distributed winding comprising a plurality of coils for each pole, and members forming the poles arranged to space apart and secure in position said coils, the members forming the center part of each pole diverging from the periphery of the armature from the center of the pole toward each side, and the other members forming a part of the pole diverging from the periphery of the armature toward the sides of the pole, the portions of said other members toward the center of the pole being longer than the adjacent portions of the members forming the center part of the pole.

2. In combination with the armature of a dynamo electric machine, a field magnet structure having a core, a distributed winding comprising a plurality of coils for each pole, and members arranged to space apart and secure in position said coils, the members forming the center part of each pole diverging from the periphery of the armature from the center of the pole toward each side, and the other members forming a part of the pole diverging from the periphery of the armature toward the sides of the pole at a greater angle than that of the members forming the center of the pole, the portions of said other members toward the center of the pole being longer than the adjacent portions of the members forming the center part of the pole.

3. In a dynamo electric machine, a rotatable member comprising a core, a winding thereon having end turns or connections, an end cover and cylindrical cover for said end turns, said end cover and cylindrical cover having coöperating tapered portions which keep the cylindrical cover properly centered when the latter is subjected to centrifugal force.

4. In a dynamo electric machine, a rotatable member comprising a core, windings thereon having end turns or connections, an end cover and a cylindrical cover for said end turns, said end cover having its outside periphery tapered and said cylindrical cover having a portion of its inside periphery tapered to coöperate with the taper on said end cover.

5. In a dynamo electric machine, a rotatable member comprising a core, windings thereon having end turns or connections, an end cover and a cylindrical cover for said end turns, said end cover having its outside periphery tapered and said cylindrical cover having a portion of its inside periphery tapered to coöperate with the taper on said end cover, and a member fastened to said end cover exerting a lateral pressure on said cylindrical cover.

In witness whereof, I have hereunto set my hand this 18th day of May 1909.

HENRY G. REIST.

Witnesses:
BENJAMIN B. HULL,
HELEN ORFORD.